United States Patent
Lang et al.

(10) Patent No.: US 10,457,175 B2
(45) Date of Patent: Oct. 29, 2019

(54) CUSHION WITH SPATIALLY VARYING LATTICE STRUCTURES

(71) Applicant: GM GLOBAL TECHNOLOGY OPERATIONS LLC, Detroit, MI (US)

(72) Inventors: Steven C. Lang, Columbus, MI (US); Nilesh D. Mankame, Ann Arbor, MI (US); Brennon L. White, Novi, MI (US); Daniel J. Ridgeway, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 15/677,232

(22) Filed: Aug. 15, 2017

(65) Prior Publication Data
US 2019/0054847 A1 Feb. 21, 2019

(51) Int. Cl.
  *B60N 2/64* (2006.01)
  *B60N 2/56* (2006.01)
  *B60N 2/50* (2006.01)

(52) U.S. Cl.
  CPC ............... *B60N 2/64* (2013.01); *B60N 2/50* (2013.01); *B60N 2/5621* (2013.01)

(58) Field of Classification Search
  USPC ..................................... 297/452.55, 452.52
  See application file for complete search history.

(56) References Cited

U.S. PATENT DOCUMENTS

| | | | | |
|---|---|---|---|---|
| 3,853,352 A | * | 12/1974 | Ambrose | A47C 7/20 297/452.57 |
| 5,490,718 A | * | 2/1996 | Akizuki | B60N 2/507 297/452.18 |
| 6,213,557 B1 | * | 4/2001 | Aebischer | A47C 7/185 297/452.55 |
| 2004/0123980 A1 | * | 7/2004 | Queheillalt | C23C 14/046 165/133 |
| 2006/0048640 A1 | * | 3/2006 | Terry | F41H 5/0414 89/36.02 |
| 2014/0021645 A1 | * | 1/2014 | Rayess | B29C 45/14 264/69 |
| 2014/0215720 A1 | * | 8/2014 | Escobar Uribe | A47C 7/021 5/654 |
| 2014/0272275 A1 | * | 9/2014 | Yang | G02B 6/138 428/116 |
| 2016/0360828 A1 | * | 12/2016 | Guyan | A43B 13/186 |

FOREIGN PATENT DOCUMENTS

CN  203126589 U  *  8/2013

OTHER PUBLICATIONS

U.S. Appl. No. 15/388,652, Iyer et al., filed Dec. 22, 2016.
Zok, Frank W., Ryan M. Latture, Matthew R. Begley. "Periodic truss structures". Journal of the Mechanics and Physics of Solids 96 (2016) www.elsevier.com/locate/jmps. pp. 184-203.

* cited by examiner

*Primary Examiner* — Milton Nelson, Jr.

(57) ABSTRACT

A seat structure is configured to support an occupant. The seat structure includes a suspension. A seat cushion is arranged adjacent to the suspension. The seat cushion defines a plurality of variable effective property regions. At least one of the plurality of variable effective property regions includes a regular periodic lattice structure.

19 Claims, 7 Drawing Sheets

CUSHION WITH SPATIALLY VARYING LATTICE STRUCTURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to cushions, and more particularly to cushions with spatially varying properties for vehicle applications or furniture.

SUMMARY

A seat structure is configured to support an occupant. The seat structure includes a suspension. A seat cushion is arranged adjacent to the suspension. The seat cushion defines a plurality of variable effective property regions. At least one of the plurality of variable effective property regions includes a regular periodic lattice structure.

In other features, a seat cover material is disposed upon the seat cushion. The plurality of variable effective property regions includes a first modulus region including a first lattice structure having a first elasticity tensor and a second modulus region including a second lattice structure having a second elasticity tensor that is different than the first elasticity tensor. The suspension comprises a plate including a plurality of through holes. The suspension comprises a manufactured fabric.

In other features, the seat cushion comprises a urethane-based polymer. A portion of the seat cushion is fabricated by an additive manufacturing process. The seat cushion is produced using molding. The seat cushion is produced using at least one of weaving and/or knitting. The seat cushion comprises at least one region made of a periodic cellular material with open cells.

In other features, the seat cushion enables an air flow rate of at least 20 ft$^3$/min without explicitly defined macroscopic air flow passages. The plurality of variable modulus regions limit excursion of static contact pressure under a seated occupant beyond 1.5 psi.

In other features, locations and effective moduli of the plurality of variable effective property regions in the seat cushion are based upon at least one of a body pressure distribution map and a static pressure map.

In other features, the regular periodic lattice structure includes a plurality of unit cells each including first rods connected to second rods. The first rods have a first stiffness and second rods have a second stiffness that is different from the first stiffness.

In other features, the regular periodic lattice structure includes first unit cells and second unit cells. The first unit cells include first rods having a first stiffness and the second unit cells include second rods having a second stiffness.

In other features, a plurality of the first unit cells occupies the same volume as a single one of the second unit cells. The first unit cells have a first height and the second unit cells have a second height that is less than the first height. The first unit cells are more compliant than the second unit cells. The suspension comprises a fabric that is made by knitting or weaving, Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3 to 5C illustrate examples of lattice structures formed in the seat cushion.

In the drawings, reference numbers may be reused to identify similar and/or identical elements.

DETAILED DESCRIPTION

The present disclosure relates to cushions for vehicle or furniture applications. Examples of vehicle applications include seat bottoms, seat backs, arm rests, roof liners, and head rests. Examples of furniture applications include seat bottoms, seat backs, arm rests, head rests, and foot rests.

In some examples, the seat cushion includes regular periodic lattice structures defining spatially varying properties. The spatially varying properties are designed to improve mechanical and thermal comfort of the occupant. As an example, the effective modulus of the seat cushion varies spatially in a manner that produces an ergonomically favorable pressure distribution. The pressure distribution is non-uniform due to the fact that certain regions of the seated human body such as the sitting bones (ischial tuberosities) and upper thighs can withstand much higher pressures than other regions such as the tail bone (coccyx) and lower thighs.

Variation in the effective modulus of the cushion ensures that the regions that are capable of bearing loads carry the bulk of the occupant's weight for a wide range of occupant sizes and body types. While the foregoing description relates to seat bottoms and seat backs for vehicles, skilled artisans will appreciate that the teachings set forth herein can be used for any type of contact surface, cushion, roof liner, seat bottom or seat back for couches, seats, chairs and other types of furniture.

Figure 1A:
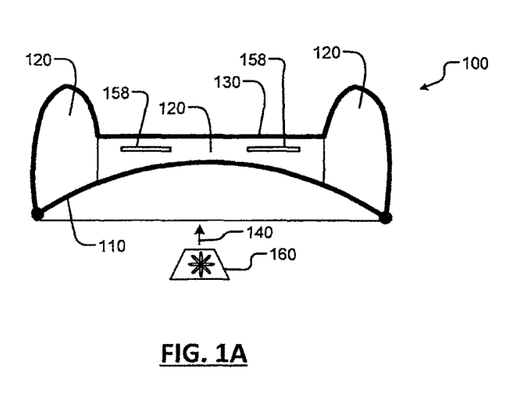
FIG. 1A is a side cross-sectional view of an example of a seat structure such as a seat bottom or seat back including a suspension, a seat cushion with spatially varying properties, and a seat cover according to the present disclosure.

Referring to FIGS. 1A-1D, a seat structure 100 is designed to support an occupant. In FIG. 1A, the seat structure 100 is shown to include a suspension 110 that supports a seat cushion 120. A seat cover material 130 is arranged over the seat cushion 120. In some examples, a heating and/or cooling element 158 may be embedded in the seat cushion 120. An airflow source 160 such as a fan, an outlet for a heating, cooling or ventilation (HVAC) duct, or another source for heated air or cooled air may be arranged below and/or at sides of the seat structure 100 when installed to supply air flow 140 directed towards the underside of the seat structure 100 and/or sides of the seat structure 100.

Figure 1B:
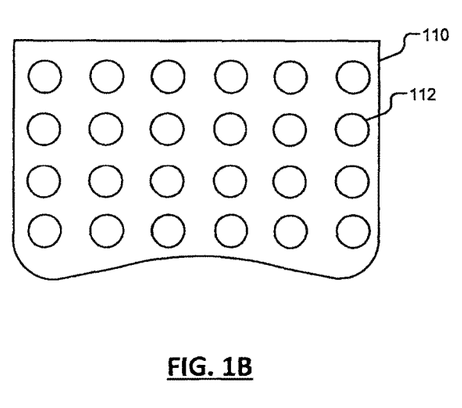
FIG. 1B is a plan view of an example of the suspension according to the present disclosure.

In FIGS. 1A and 1B, the suspension 110 is shown to include one or more portions that mechanically support the seat cushion 120. In some examples, the suspension 110 may include a flat or arcuate plate that is attached to the seat base and acts as a suspension element, although other types of support structures can be used. The suspension 110 may be arranged under and in contact with the seat cushion 120. The suspension 110 may include a plurality of through holes 112 (as best seen in FIG. 1B) to improve air flow to the seat cushion 120. While the suspension 110 is shown as a unitary member, additional support structure members may be provided.

Figure 1C:
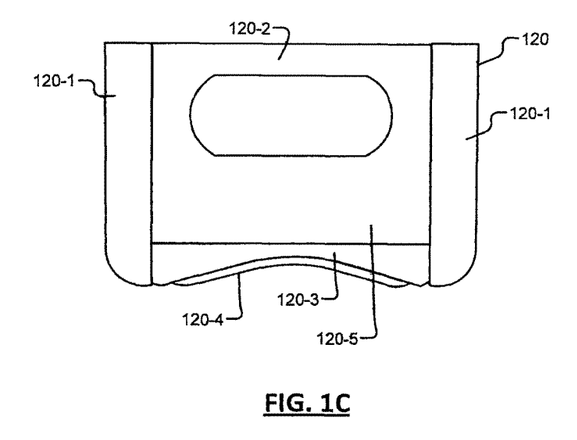
FIG. 1C is a plan view of an example of the seat cushion according to the present disclosure.

The seat cushion 120 in FIGS. 1A and 1C is arranged on top of the suspension 110. In some examples, the seat cushion 120 and/or suspension 110 are fabricated as a single unitary piece or a monolithic core. In some examples, the seat cushion 120 and/or suspension 110 is made using an additive manufacturing process, molding, and/or a manufactured fabric. In some examples, the manufactured fabric includes weaving or knitting. In other examples, the seat cushion 120 and/or suspension 110 is made by assembling two or more portions into the seat cushion 120 and/or suspension 110 and attaching them together, to the suspension and/or to the trim using adhesives, fusion welding, etc.

The seat cushion 120 is configured to support an occupant in a sitting position. In some examples, the seat cushion 120 defines regions with differing properties as will be described further below. In some examples, the seat cushion 120 comprises one or more regular, periodic lattice structures with spatially varying properties.

In some examples, the spatial variation in properties may be specially designed to address a particular pattern of compression/pressures/strains that are expected to be exerted by the seat occupant during use. As an example, the seat cushion 120 includes variable effective property regions with different effective compressive moduli (high, medium and/or low) that correspond to estimated, simulated or actual maps of areas of variable compression (high, medium and/or low) attributable to the seat occupant during use. The objective of this spatial variation in the effective modulus of the cushion is to minimize regions in which the static contact pressure experienced by the occupant exceeds 1.5 psi to address occupant comfort. As used herein, static contact pressure refers to pressures that result from an occupant slowly lowering him/herself into the seat (without dynamic effects).

In FIGS. 1A and 1C, the seat cushion 120 is designed to allow air flow 140 to pass there through. The seat cushion 120 may define different seat base portions 120-1, 120-2, 120-3, 120-4 and 120-5 having different lattice unit cell topologies and/or dimensions. In some examples, the air flow 140 originates from the airflow source 160. In some examples, the construction of the seat cushion 120 enables an air flow rate of at least 20 ft$^3$/min there through. In other examples, the construction of the seat cushion 120 enables an air flow rate of at least 15 ft$^3$/min there through. In many motor vehicle systems, the airflow source 160 generates the desired flow rate at a pressure of 0.60 in·W·g. while operating at a duty cycle less than or equal to 75% and while operating at about 12 Volts.

In some examples, the seat cushion 120 enables an air flow rate of at least 4.5 ft$^3$/min there through when an occupant is occupying the seat structure 100. In some examples, the seat cushion 120 enables an air flow rate of at least 6.5 ft$^3$/min there through when an occupant is occupying the seat structure 100. In many motor vehicle systems with an occupant occupying the seat structure 100, this flow rate can be attained at a pressure of 0.80 in·W·g. using the airflow source 160 such as a fan under a 75% duty cycle at about 12 Volts.

In some examples, the seat cushion 120 utilizes a material with a lattice construction that occupies less than 25% of the volume of the seat cushion 120 while meeting the mechanical requirements for supporting the seat occupant. In some examples, the lattice material may occupy at most 20% of the seat cushion 120 while meeting the mechanical requirements. In other examples, the lattice material may occupy a volume in a range from 15% to 25% of the seat cushion 120 while meeting the mechanical requirements.

In some examples, the seat cushion 120 can support the air flow there through without the presence of ventilation passages that are explicitly provided as conduits for the flow of heated or cooled air. Some premium conventional foam-formed seat cushions can be multi-piece (not monolithic) and typically require the use of explicitly defined ventilation passages to provide sufficient air flow because the polyurethane foam used in these cushions have closed cells with varying sizes that are randomly distributed throughout the volume of the cushion. The seat cushion 120 according to the present disclosure enables larger air flows without explicit ventilation passages because of the low relative density, open unit cell design and periodic (or regular) construction. The open unit cells are arranged in a regular manner to create the lattice material. This results in the open cell construction having very low resistance to the flow of air.

The seat cushion 120 can exhibit one or more of the following properties: wear resistance; substantial elastic recovery under operational conditions; and a relatively ratio of shear modulus to compressive modulus that can be varied over a wide range such as 0.2 to 2.

In some examples, the seat cushion 120 is printed using a 3D printer that prints one or more polymers and/or copolymers. In these embodiments, the seat cushion 120 is printed with variably aligned, offset or staggered geometric structures and/or gaps as will be described further below. A non-limiting example of a suitable polymeric material for the seat cushion 120 includes a thermoplastic urethane that is capable of being printed using a 3D printer.

Figure 1D:
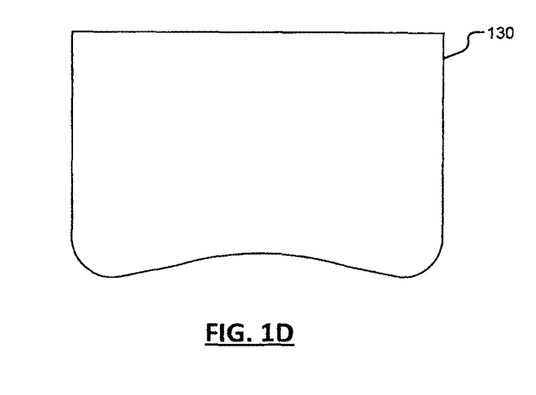
FIG. 1D is a plan view of an example of the seat cover according to the present disclosure.

In FIGS. 1A and 1D, the seat cover material 130 is arranged on the seat cushion 120, which is disposed on the suspension 110. In some examples, the seat cushion 120 includes lateral seat bolsters. In some examples, the seat cover material 130 is perforated to allow air flow 140 there through. Thus, the air flow 140 can be transmitted from the airflow source 160 through the suspension 110, the seat cushion 120, and the seat cover material 130 to reach the seat occupant.

In some examples, the air flow 140 can be sufficient to adjust the temperature for the comfort of the seat occupant, both for heat and cold, without requiring a heater or cooler in the seat cushion. In other examples, the seat structure 100 may further include the heating and/or cooling element 158 such as a resistive heater or a thermoelectric device (TED) disposed within the seat cushion 120. A climate controller (not shown) may be used to supply power to and/or control the airflow source 160 and the heaters 158.

Figure 2A:
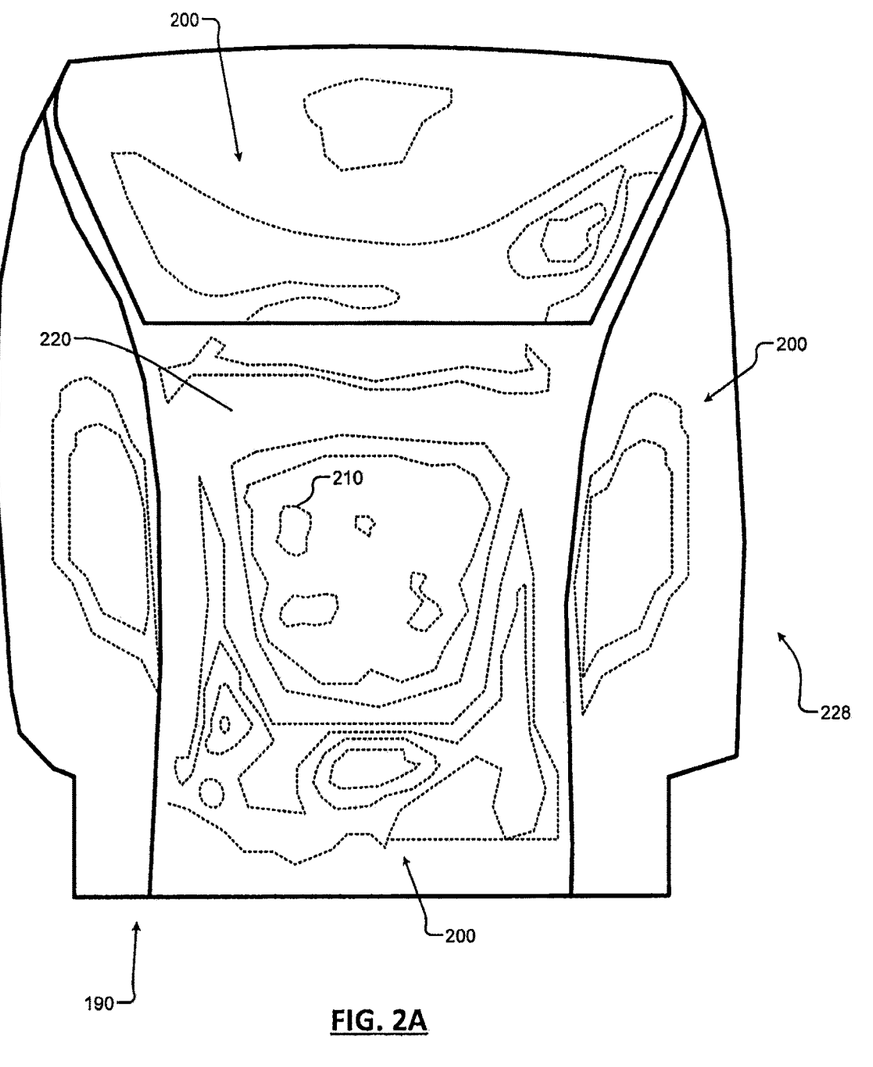
FIGS. 2A and 2B are plan views of a seat cushion illustrating examples of variable compression regions when an occupant is seated.
Figure 2B:
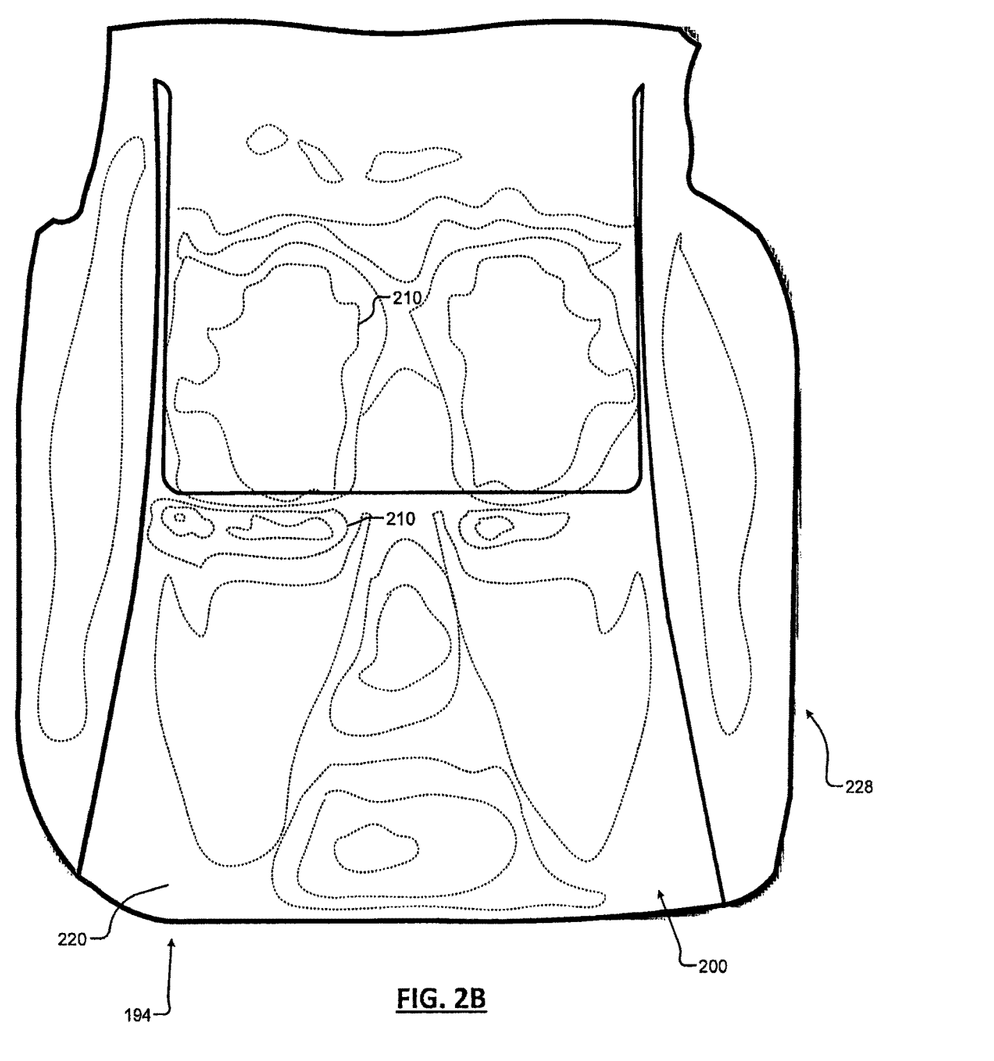

Referring now to FIGS. 2A-2B, examples of load maps 190, 194 for a seat back and a seat bottom are shown, respectively. An occupant sitting on a cushion gives rise to varying contact pressure regions 200. Some of the regions 200 are associated with higher local contact pressure (such as at 210) while other regions are associated with lower local contact pressure (such as at 220). In some examples, seat bolsters 228 are made of a material having a ratio of the shear modulus to compressive modulus that is higher than a typical foam seat cushion. This makes entry and egress easier (i.e., less pressure on legs when they slide over the bolsters) without compromising comfort in the driving position.

There are a wide variety of lattice structures that can be used. While specific examples are shown and described below, other lattice structures such as those described in "Periodic Truss Structures", Journal of Mechanics and Physics of Solids, Frank W. Zok, Ryan M. Latture and Matthew R. Begley, 96 (2016), pages 184-203, which is hereby incorporated by reference in its entirety, can be used.

Figure 3:
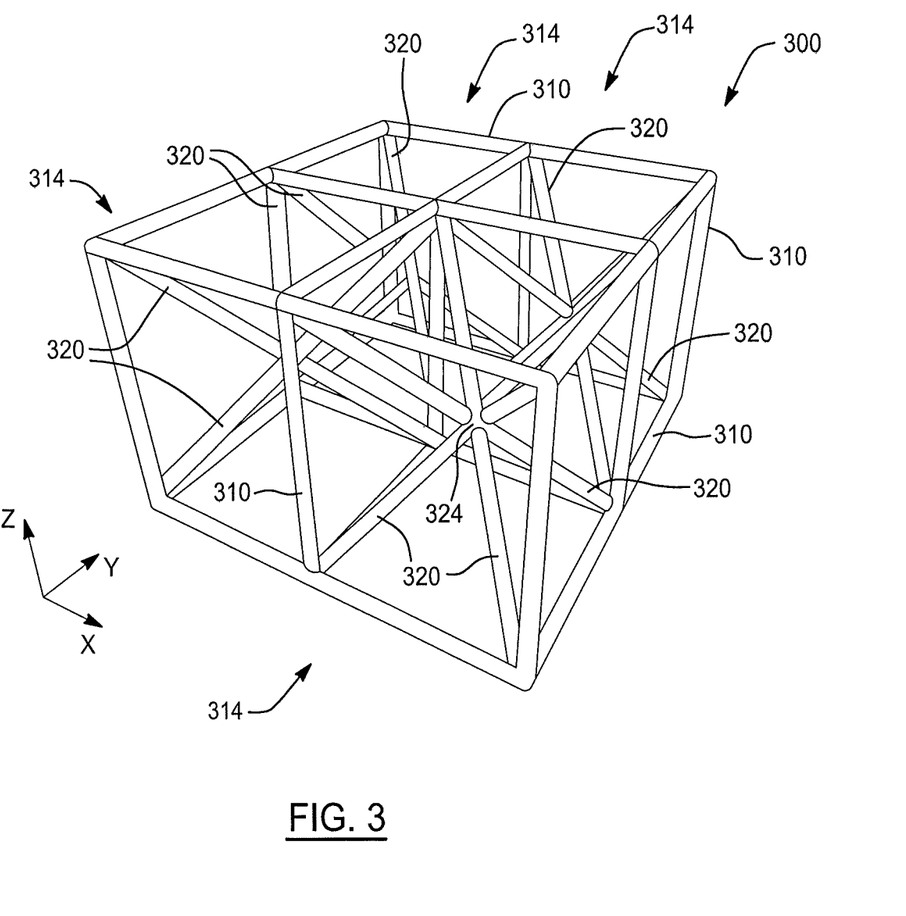

Referring now to FIGS. 3-5C, non-limiting examples of lattice structures that can be used are shown. In FIG. 3, a lattice structure 300 defines unit cells 314 including first rods 310 arranged along x, y and z axes. In this example, the unit cells 314 have a box or cube-like shape, although other shapes can be used. The unit cells 314 share one or more edges with the unit cells 314 that are adjacent thereto. Second rods 320 are arranged as diagonals in the unit cells 314. The second rods 320 extend from corners of the unit cells 314 (defined by ends of the first rods 310) to a center 324 of the unit cells 314.

By controlling the stiffness of the second rods 320 relative to the first rods 310 in the unit cells 314, the ratio of the uniaxial compressive modulus in any direction (X, Y or Z) to the shear modulus can be varied. In some examples, the ratio can be decreased by making the second rods 320 stiffer than the first rods 310. This may be desirable for bolster supports to mitigate the design trade-off between adequate lateral support during cornering with ease of entry/egress.

Figure 4:
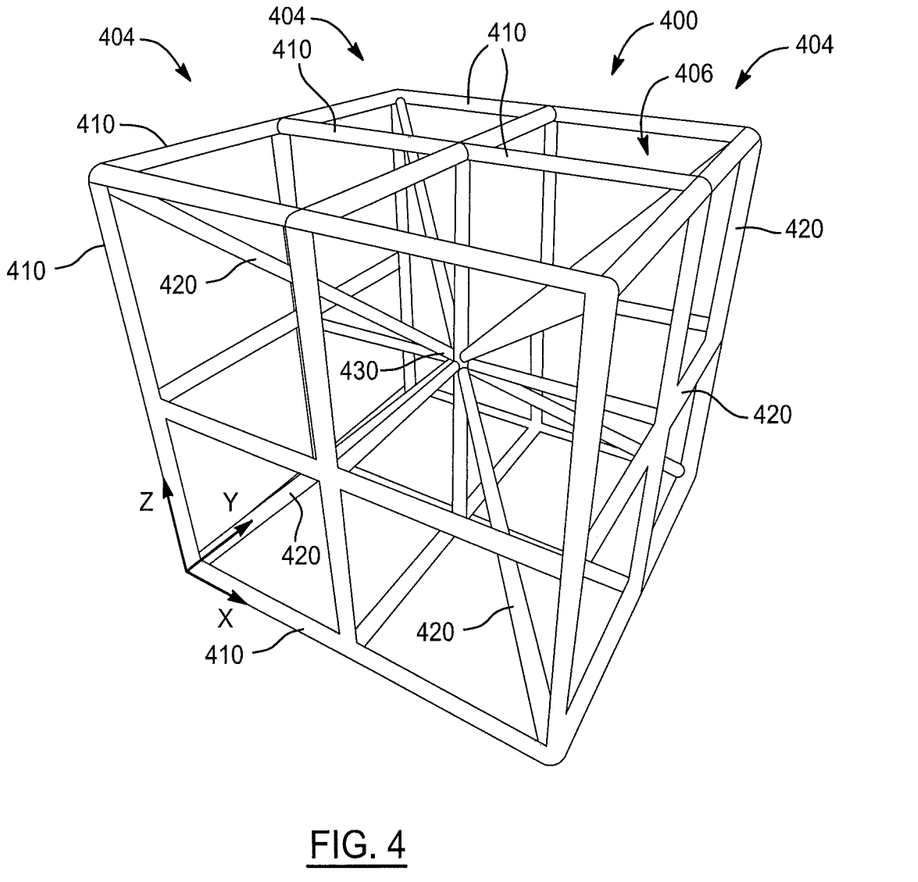

Referring now to FIG. 4, another example of a lattice structure 400 is shown. In this example, the lattice structure 400 includes first and second unit cells 404 and 406, respectively, that occupy the same volume. In some examples, four of the first unit cells 404 occupy the same volume as one of the second unit cells 406. The first unit cells 404 include first rods 410 arranged along x, y and z axes. In this example, the first unit cells 404 have a box or cube-like shape, although other shapes can be used. The first unit cells 404 share one or more edges with the first unit cells 404 that are adjacent thereto. The second unit cells 406 are defined by second rods 420 that are arranged as diagonals. Opposite ends of the second rods 420 are connected from corners of the first unit cells 404 to a center node 430.

By controlling the stiffness of the second rods 420 of the second unit cells 406 relative to the first rods 410 of the first unit cells 404, the ratio of the uniaxial compressive modulus in any direction (X, Y or Z) to the shear modulus can be varied.

Figure 5A:
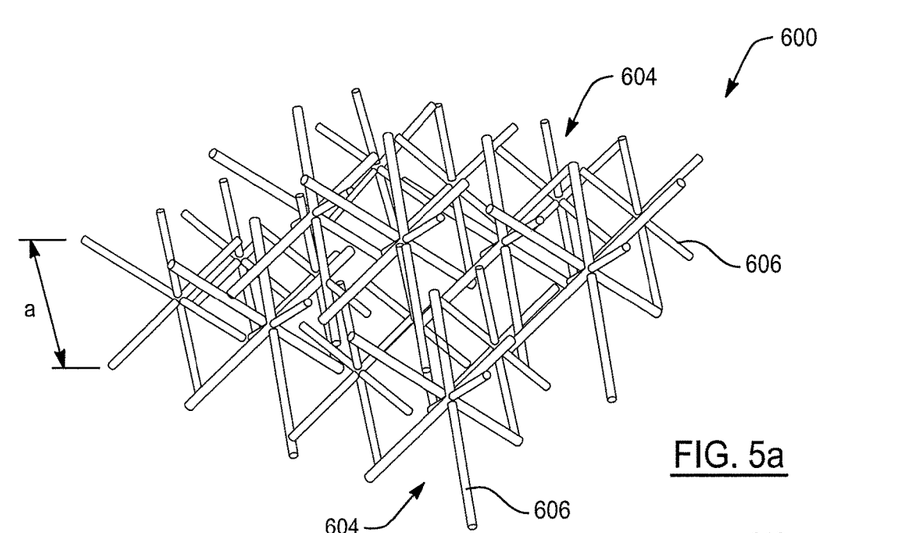
Figure 5B:
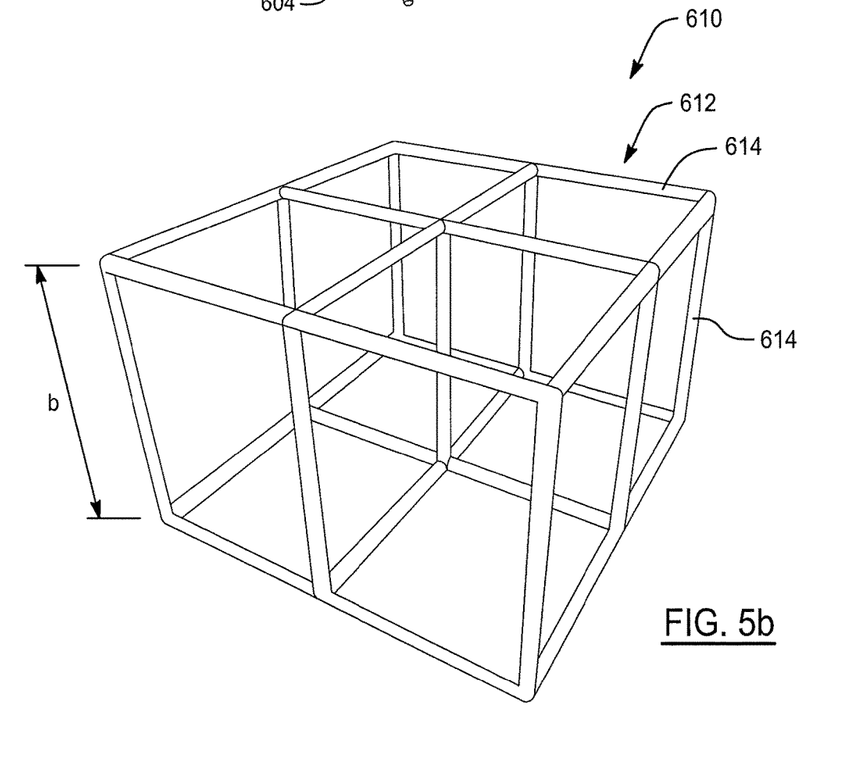
Figure 5C:
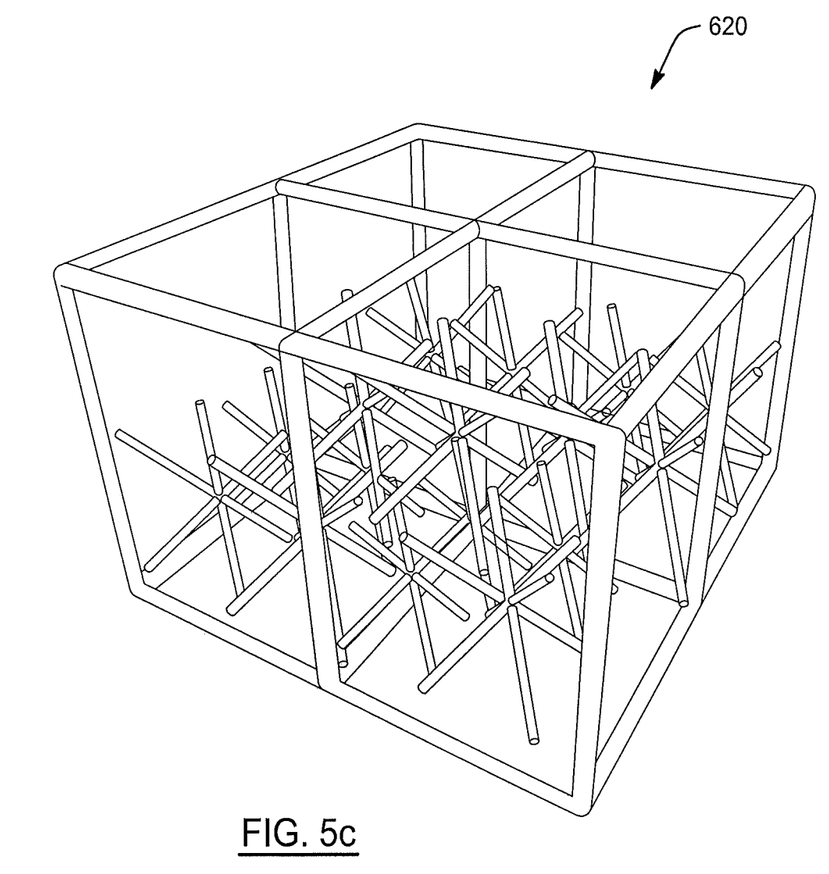

Two different lattices 600 and 610 in FIGS. 5A and 5B occupy overlapping volumes as shown in a combined structure shown in FIG. 5C. In FIG. 5A, the lattice 600 defines a lattice structure including unit cells 604 similar to those shown above and including intersecting diagonal rods 606. The unit cells 604 in FIG. 5A have a height of a.

In FIG. 5B, the lattice 610 includes box or cube-shaped unit cells 612 including rods 614. The lattice 610 has a height of b (where b>a, e.g. a=c*b where c is in a range from 0.1 to 0.9). The lattice 610 in FIG. 5B is more compliant than the lattice 600 in FIG. 5A. The stiffness of the rods 606 and 614 is varied to alter properties of the seat cushion. When vertical compression is applied to a seat cushion including the combined lattice 620 in FIG. 5C, the initial response (up to a vertical deflection of a) is due mainly to the lattice 610. Further compression will elicit a response from both of the lattices 600 and 610.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A seat structure configured to support an occupant, the seat structure comprising:
   a suspension; and
   a seat cushion arranged adjacent to the suspension,
   wherein the seat cushion defines a plurality of variable effective property regions, wherein at least one of the plurality of variable effective property regions includes a regular periodic lattice structure, and wherein the plurality of variable effective property regions includes a first modulus region including a first lattice structure having a first elasticity tensor and a second modulus region including a second lattice structure having a second elasticity tensor that is different than the first elasticity tensor.

2. The seat structure of claim 1 further comprising a seat cover material disposed upon the seat cushion.

3. The seat structure of claim 1, wherein the seat cushion is produced using a manufactured fabric.

4. The seat structure of claim 1, wherein the suspension comprises a plate including a plurality of through holes.

5. The seat structure of claim 1, wherein the suspension comprises a manufactured fabric.

6. The seat structure of claim 1, wherein the seat cushion comprises a urethane-based polymer.

7. The seat structure of claim 1, wherein at least a portion of the seat cushion is fabricated by an additive manufacturing process.

8. The seat structure of claim 1, wherein the seat cushion is produced using molding.

9. The seat structure of claim 1, wherein the seat cushion is produced using at least one of weaving and/or knitting.

10. The seat structure of claim 1, wherein the seat cushion comprises at least one region made of a periodic cellular material with open cells.

11. The seat structure of claim 1, wherein the suspension is produced using at least one of weaving and/or knitting.

12. The seat structure of claim 1, wherein the plurality of variable effective property regions limit excursion of static contact pressure under a seated occupant beyond 1.5 psi.

13. The seat structure of claim 1, wherein locations and effective moduli of the plurality of variable effective property regions in the seat cushion are based upon at least one of a body pressure distribution map and a static pressure map.

14. A seat structure configured to support an occupant, the seat structure comprising:
a suspension; and
a seat cushion arranged adjacent to the suspension,
wherein the seat cushion defines a plurality of variable effective property regions, wherein at least one of the plurality of variable effective property regions includes a regular periodic lattice structure,
wherein the regular periodic lattice structure includes a plurality of unit cells each including first rods connected to second rods, wherein the first rods have a first stiffness and second rods have a second stiffness that is different from the first stiffness.

15. A seat structure configured to support an occupant, the seat structure comprising:
a suspension; and
a seat cushion arranged adjacent to the suspension,
wherein the seat cushion defines a plurality of variable effective property regions, wherein at least one of the plurality of variable effective property regions includes a regular periodic lattice structure, and
wherein the regular periodic lattice structure includes first unit cells and second unit cells, wherein the first unit cells include first rods having a first stiffness and the second unit cells include second rods having a second stiffness.

16. The seat structure of claim 15, wherein a plurality of the first unit cells occupies the same volume as a single one of the second unit cells.

17. The seat structure of claim 15, wherein the first unit cells have a first height and the second unit cells have a second height that is less than the first height.

18. The seat structure of claim 17, wherein the first unit cells are more compliant than the second unit cells.

19. A seat structure configured to support an occupant, the seat structure comprising:
a suspension; and
a seat cushion arranged adjacent to the suspension,
wherein the seat cushion defines a plurality of variable effective property regions, wherein at least one of the plurality of variable effective property regions includes a regular periodic lattice structure,
wherein the seat cushion comprises at least one region made of a periodic cellular material with open cells, and
wherein the seat cushion enables an air flow rate of at least 20 ft$^3$/min without explicitly defined macroscopic air flow passages.

* * * * *